United States Patent
Kagami et al.

(10) Patent No.: US 7,281,044 B2
(45) Date of Patent: Oct. 9, 2007

(54) SAN INFRASTRUCTURE ON DEMAND SERVICE SYSTEM

(75) Inventors: Akira Kagami, Los Gatos, CA (US); Masayuki Yamamoto, Sunnyvale, CA (US)

(73) Assignee: Hitachi, Ltd., Tokyo (JP)

(*) Notice: Subject to any disclaimer, the term of this patent is extended or adjusted under 35 U.S.C. 154(b) by 1099 days.

(21) Appl. No.: 10/044,355

(22) Filed: Jan. 10, 2002

(65) Prior Publication Data

US 2003/0131108 A1    Jul. 10, 2003

(51) Int. Cl.
*G06F 15/173* (2006.01)

(52) U.S. Cl. .................. 709/226; 705/30; 705/34; 711/114; 711/156; 710/36

(58) Field of Classification Search ........ 709/223–226; 711/111–114; 710/36–51; 705/30, 34
See application file for complete search history.

(56) References Cited

U.S. PATENT DOCUMENTS

| | | | |
|---|---|---|---|
| 4,310,883 A | 1/1982 | Clifton et al. | |
| 4,771,375 A | 9/1988 | Beglin et al. | |
| 4,935,956 A | 6/1990 | Hellwarth et al. | |
| 5,018,060 A | 5/1991 | Gelb et al. | |
| 5,079,760 A | 1/1992 | Nemirovsky et al. | |
| 5,561,669 A | 10/1996 | Lenney et al. | |
| 5,758,050 A | 5/1998 | Brady et al. | |
| 5,890,204 A | 3/1999 | Ofer et al. | |
| 5,920,893 A | 7/1999 | Nakayama et al. | |
| 5,978,779 A | 11/1999 | Stein et al. | |
| 6,012,032 A | 1/2000 | Donovan et al. | |
| 6,012,151 A | 1/2000 | Mano | |
| 6,044,442 A | 3/2000 | Jesionowski | |
| 6,052,450 A | 4/2000 | Allison et al. | |
| 6,098,128 A | 8/2000 | Velez-McCaskey et al. | |
| 6,145,028 A * | 11/2000 | Shank et al. .................. | 710/31 |
| 6,148,377 A | 11/2000 | Carter et al. | |

(Continued)

FOREIGN PATENT DOCUMENTS

JP    2001-142648 A    5/2001

(Continued)

OTHER PUBLICATIONS

"*Virtual Nationwide Managed Ports (Per Port)*"; Global POPs; date unknown; 3 pages; Copyright 2002 GlobalPOPs. URL: http://www.globalpops.com/services.asp.

(Continued)

*Primary Examiner*—Bunjob Jaroenchonwanit
*Assistant Examiner*—Duyen Doan
(74) *Attorney, Agent, or Firm*—Sughrue Mion, PLLC.; Pavel I. Pogodin, Esq.

(57) ABSTRACT

The present invention provides improved techniques for managing storage resources, such as disk drives, I/O ports, and the like according to user demand for these storage resources. In a specific embodiment, a centralized SIoD system manages installed storage resources in a storage subsystem and connections via a network switch responsive to user demands. Specific embodiments provide users the capability to bring new resources on line, define pathways between resources and provide billing, payment and other accounting information based upon the configurations and connections established responsive to the user demands, for example.

20 Claims, 16 Drawing Sheets

Overall Configuration
of SAN Infrastructure on Demand (SIoD) Service System

U.S. PATENT DOCUMENTS

| | | | |
|---|---|---|---|
| 6,148,414 A | 11/2000 | Brown et al. | |
| 6,192,454 B1 | 2/2001 | De Vos | |
| 6,198,915 B1 | 3/2001 | McGregor et al. | |
| 6,209,024 B1 | 3/2001 | Armstrong et al. | |
| 6,212,606 B1 | 4/2001 | Dimitroff | |
| 6,230,247 B1 | 5/2001 | Cannon et al. | |
| 6,233,623 B1 | 5/2001 | Jeffords et al. | |
| 6,247,103 B1 | 6/2001 | Kern et al. | |
| 6,260,120 B1 * | 7/2001 | Blumenau et al. | 711/152 |
| 6,263,350 B1 | 7/2001 | Wollrath et al. | |
| 6,279,040 B1 | 8/2001 | Ma et al. | |
| 6,289,398 B1 | 9/2001 | Stallmo et al. | |
| 6,314,503 B1 | 11/2001 | D'Errico et al. | |
| 6,338,046 B1 | 1/2002 | Saari et al. | |
| 6,356,985 B1 | 3/2002 | Ichimi et al. | |
| 6,442,659 B1 | 8/2002 | Blumenau | |
| 6,484,160 B1 | 11/2002 | Richard et al. | |
| 6,502,136 B1 | 12/2002 | Higuchi et al. | |
| 6,502,162 B2 | 12/2002 | Blumenau et al. | |
| 6,519,471 B1 | 2/2003 | Yamaguchi | |
| 6,553,401 B1 | 4/2003 | Carter et al. | |
| 6,597,956 B1 | 7/2003 | Aziz et al. | |
| 6,606,695 B2 * | 8/2003 | Kamano et al. | 711/163 |
| 6,640,278 B1 | 10/2003 | Nolan et al. | |
| 6,647,387 B1 * | 11/2003 | McKean et al. | 707/9 |
| 6,654,830 B1 | 11/2003 | Taylor et al. | |
| 6,665,706 B2 | 12/2003 | Kenner et al. | |
| 6,687,677 B1 | 2/2004 | Barnard et al. | |
| 6,820,171 B1 * | 11/2004 | Weber et al. | 711/114 |
| 6,839,815 B2 * | 1/2005 | Kagami et al. | 711/148 |
| 6,907,457 B2 * | 6/2005 | Merrell et al. | 709/223 |
| 6,976,457 B2 * | 12/2005 | Klaric | 123/73 A |
| 7,010,493 B2 * | 3/2006 | Yamamoto et al. | 705/1 |
| 2001/0034704 A1 | 10/2001 | Farhat et al. | |
| 2001/0056480 A1 | 12/2001 | Taylor et al. | |
| 2002/0035492 A1 | 3/2002 | Nonaka | |
| 2002/0087441 A1 * | 7/2002 | Wagner et al. | 705/30 |
| 2002/0087682 A1 | 7/2002 | Roach | |
| 2002/0091828 A1 | 7/2002 | Kitamura et al. | |
| 2002/0097747 A1 | 7/2002 | Kirkby et al. | |
| 2002/0107956 A1 | 8/2002 | Nakagawa et al. | |
| 2002/0112043 A1 * | 8/2002 | Kagami et al. | 709/223 |
| 2002/0124134 A1 | 9/2002 | Chilton | |
| 2002/0147693 A1 | 10/2002 | Banerjee et al. | |
| 2002/0152364 A1 | 10/2002 | Gunaseelan et al. | |
| 2002/0162047 A1 | 10/2002 | Peters et al. | |
| 2002/0166033 A1 | 11/2002 | Kagami et al. | |
| 2002/0188576 A1 | 12/2002 | Peterson et al. | |
| 2002/0194504 A1 | 12/2002 | Leskuski et al. | |
| 2003/0005119 A1 * | 1/2003 | Mercier et al. | 709/225 |
| 2003/0023732 A1 | 1/2003 | Cohen | |
| 2003/0061129 A1 | 3/2003 | Todd et al. | |
| 2003/0088513 A1 | 5/2003 | Gritzmacher et al. | |
| 2003/0088658 A1 * | 5/2003 | Davies et al. | 709/223 |
| 2003/0093567 A1 | 5/2003 | Lolayekar et al. | |
| 2003/0105855 A1 | 6/2003 | Wynnyk | |
| 2003/0115073 A1 * | 6/2003 | Todd et al. | 705/1 |
| 2003/0115118 A1 * | 6/2003 | Reinemann | 705/30 |
| 2003/0177162 A1 | 9/2003 | Staiger et al. | |
| 2003/0191804 A1 | 10/2003 | Yasuda et al. | |
| 2003/0236745 A1 * | 12/2003 | Hartsell et al. | 705/40 |

FOREIGN PATENT DOCUMENTS

| | | |
|---|---|---|
| WO | WO 01/33456 A2 | 5/2001 |

OTHER PUBLICATIONS

Gibson, Garth A. and Rodney Van Meter; "*Network Attached Storage Architecture*"; Communications of the ACM; Nov. 2002; pp. 37-45; Vo. 43, No. 11.

Duffield, Nick et al.; "*Charging from Sampled Network Usage*"; AT&T Labs—Research; date unknown; 12 pages.

"*Network Storage Info Center*"; EMC; date unknown; 4 pages; Copyright 2000-2004, TechTarget. URL:http://searchstorage.techtarget.com/infoCenter/0,294261,sid5,00.html.

* cited by examiner

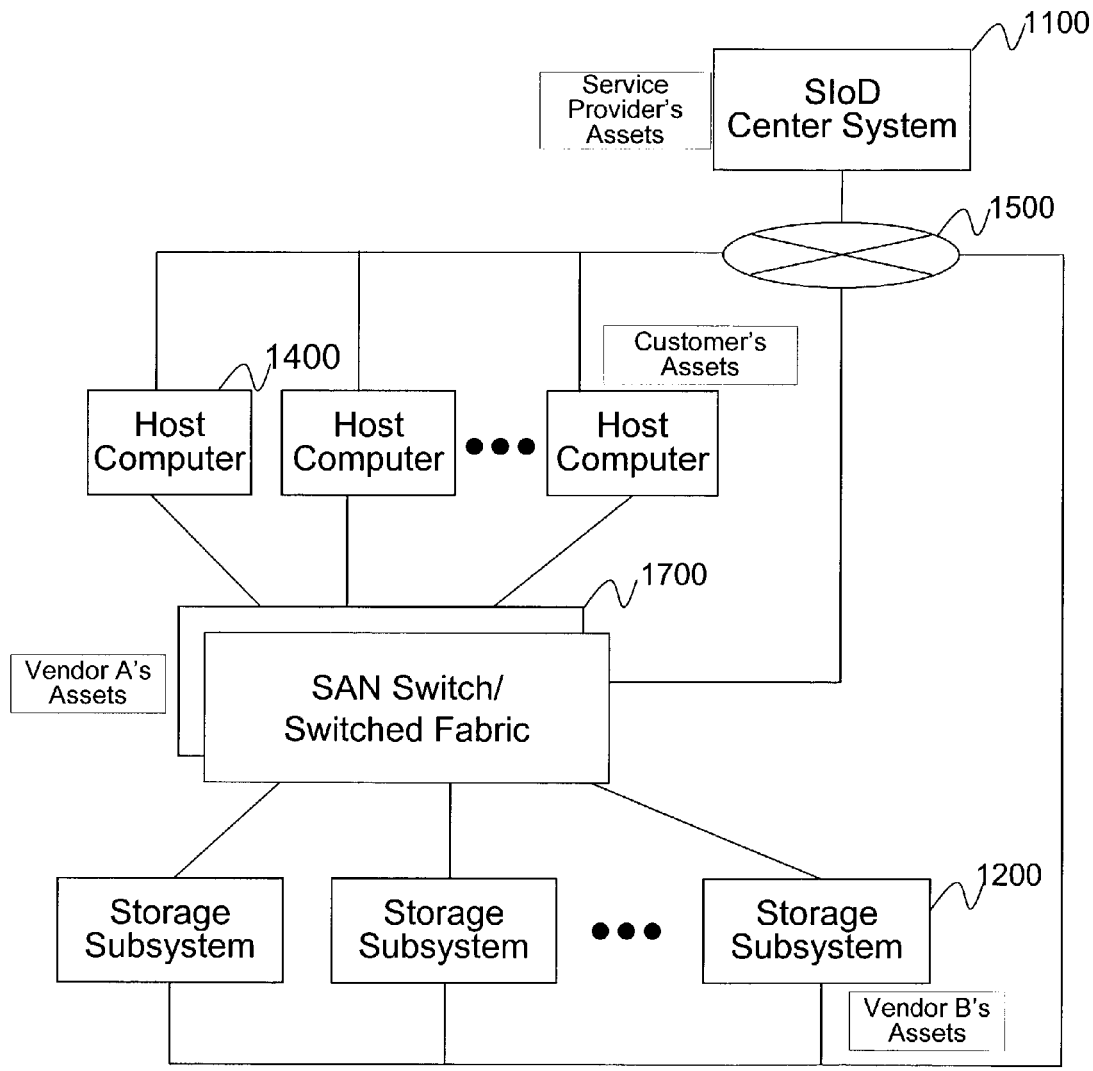
Figure 1: Overall Configuration
of SAN Infrastructure on Demand (SIoD) Service System

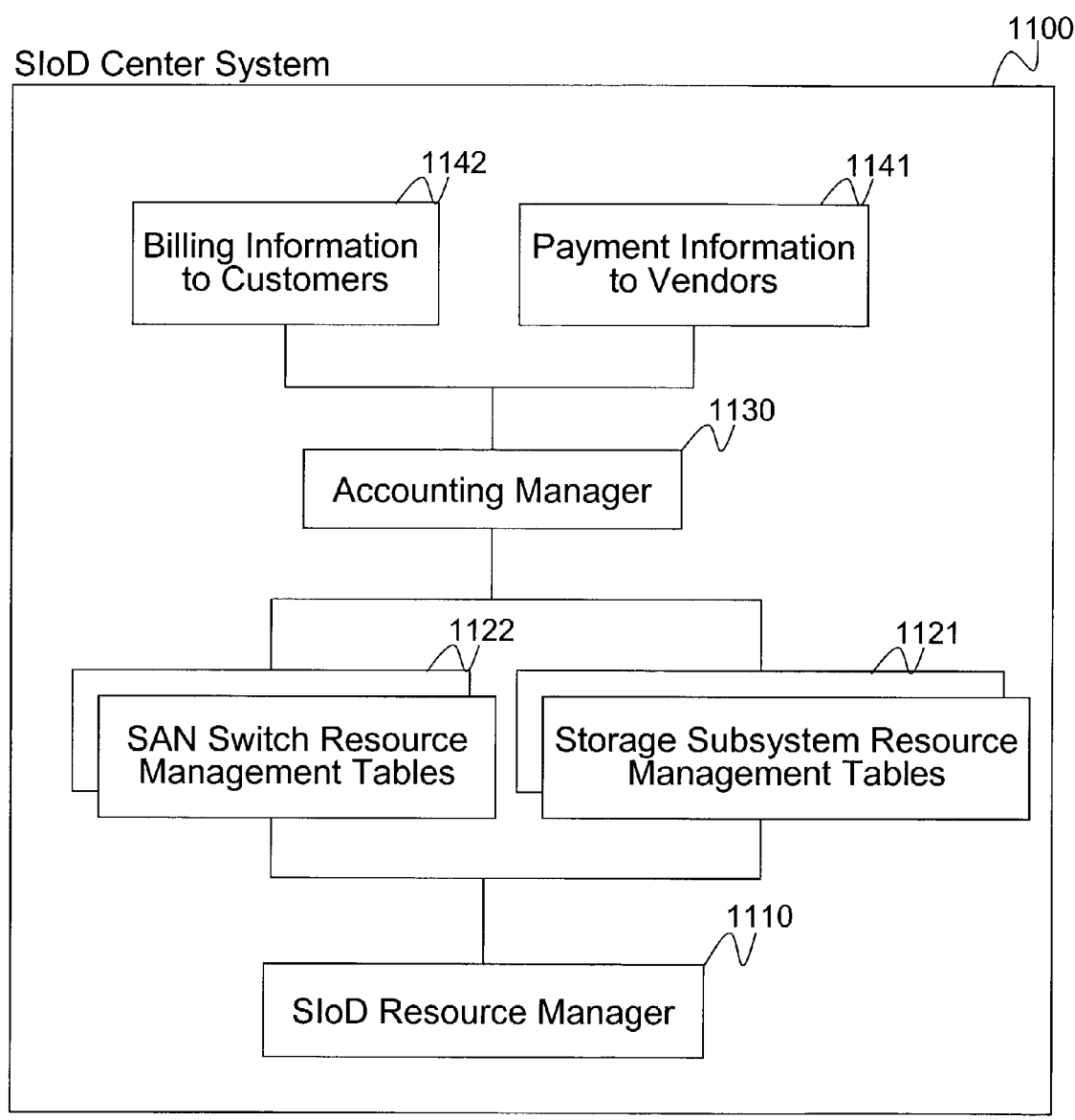
Figure 2: Configuration of SIoD Center System 1100

Figure 3: Configuration of Host Computer 1400
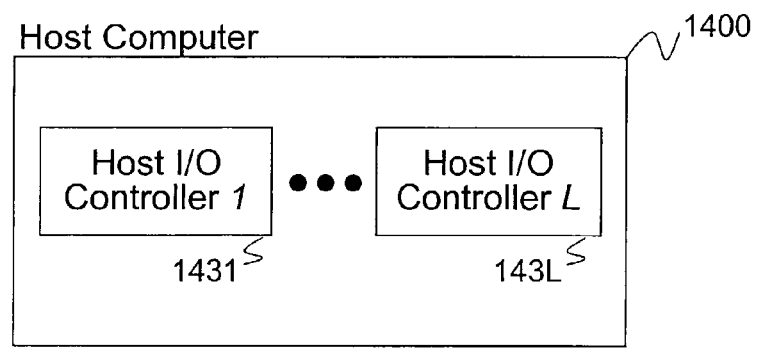
Figure 4: Configuration of SAN Switch 1700
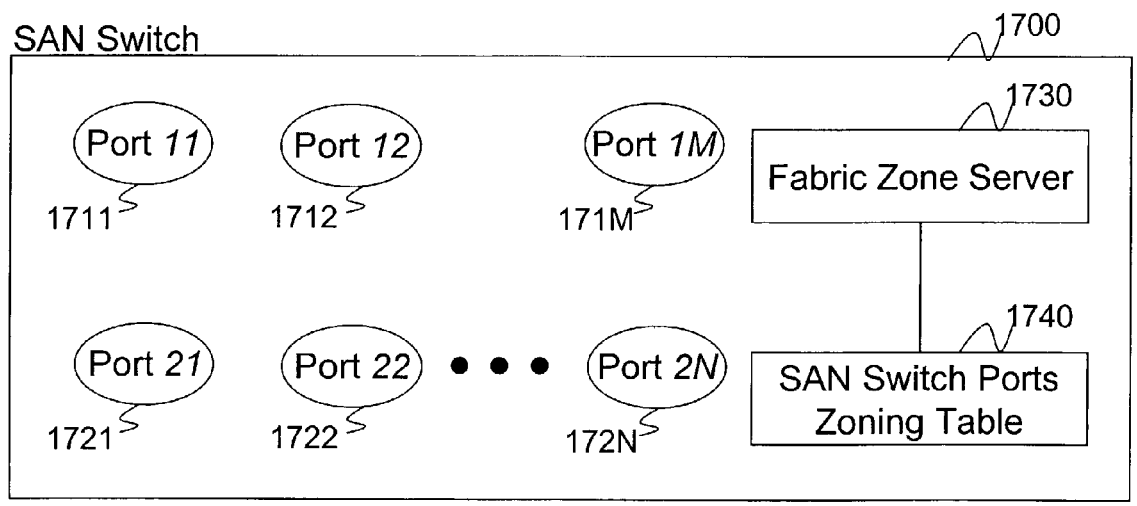

Figure 5: Configuration of Storage Subsystem 1200
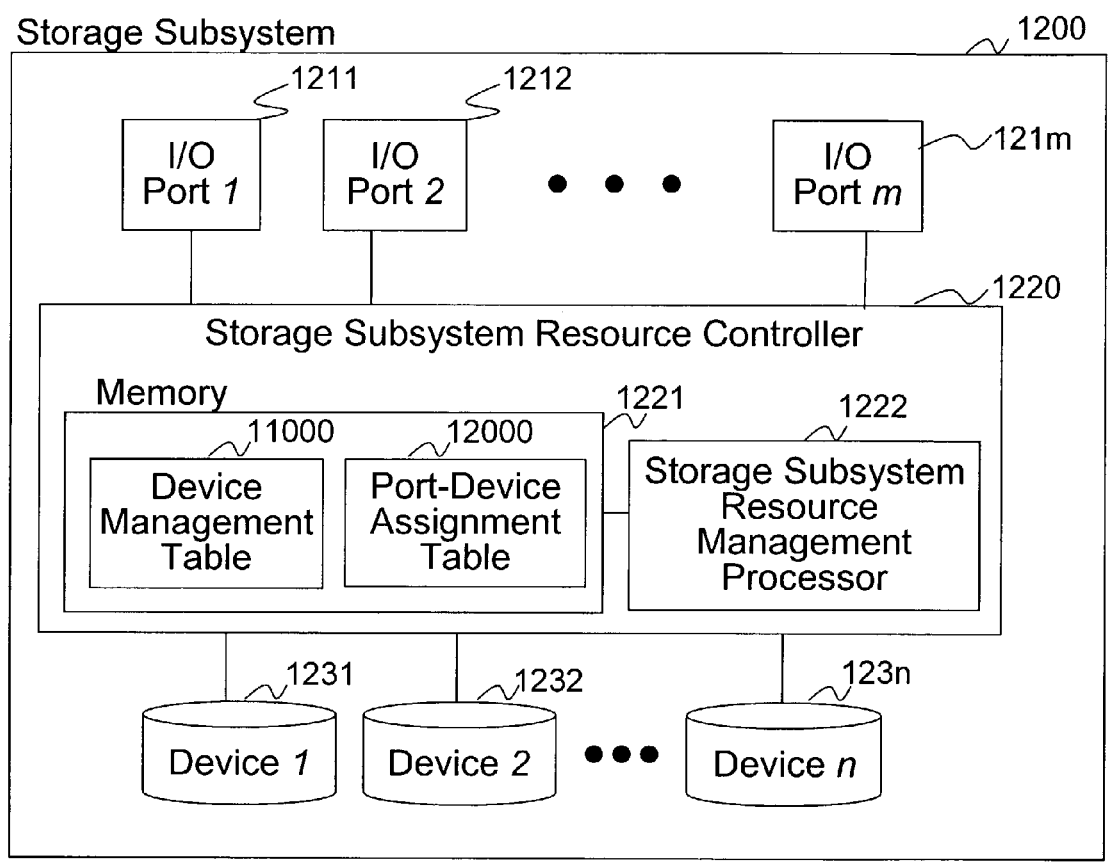

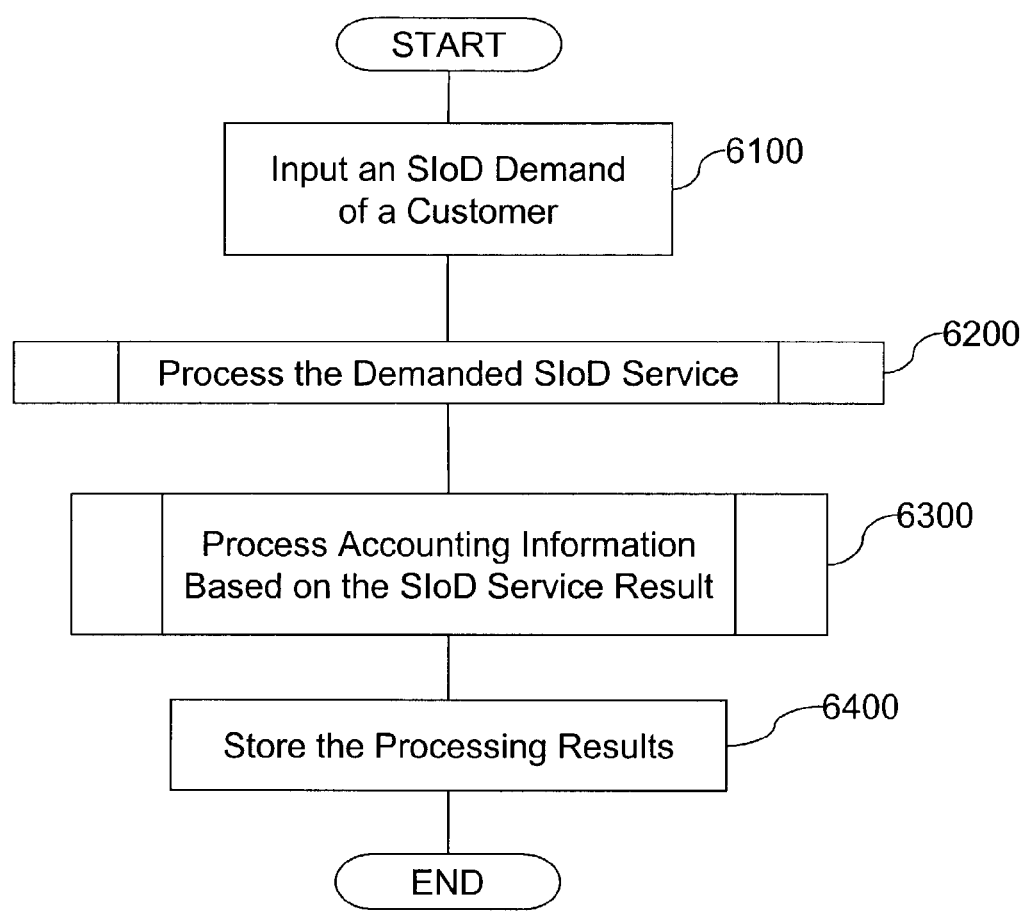
Figure 6: General Processing Flow of SIoD Center System 1100

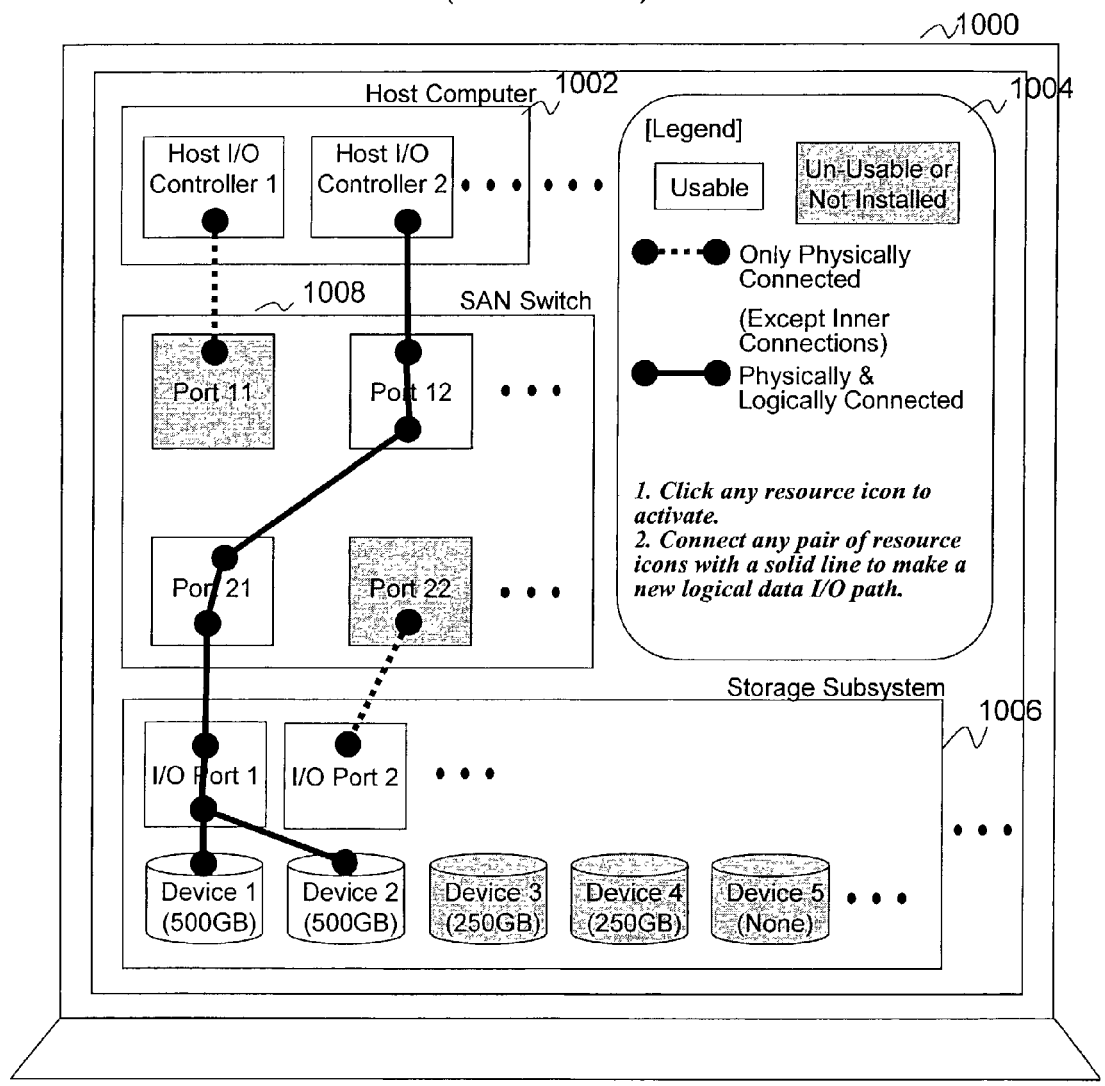
Figure 7: GUI of SIoD Demand Input
(Before SIoD)

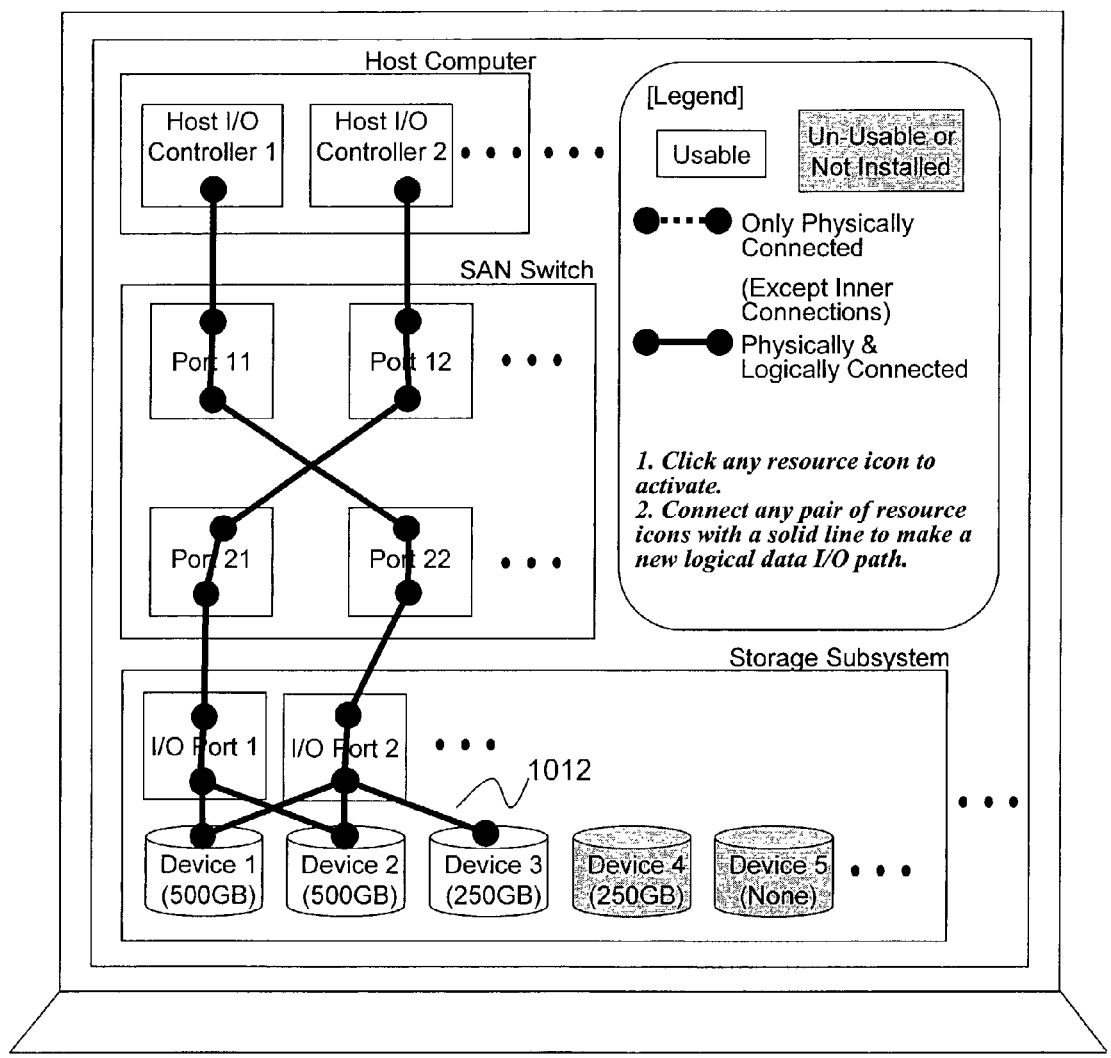
Figure 8: GUI of SIoD Demand Input
(After SIoD)

Figure 9: Detailed Processing Flow of Step 6200
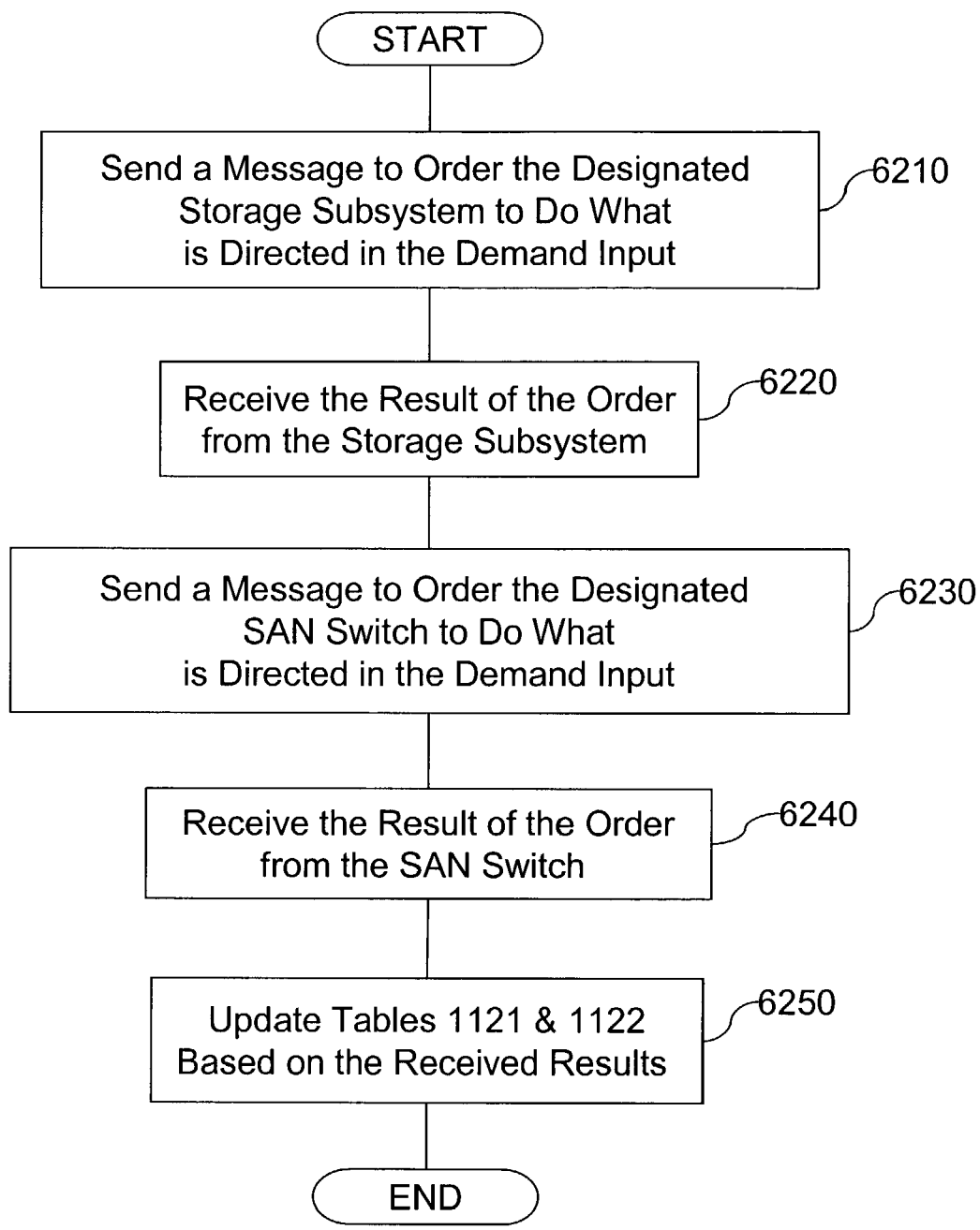

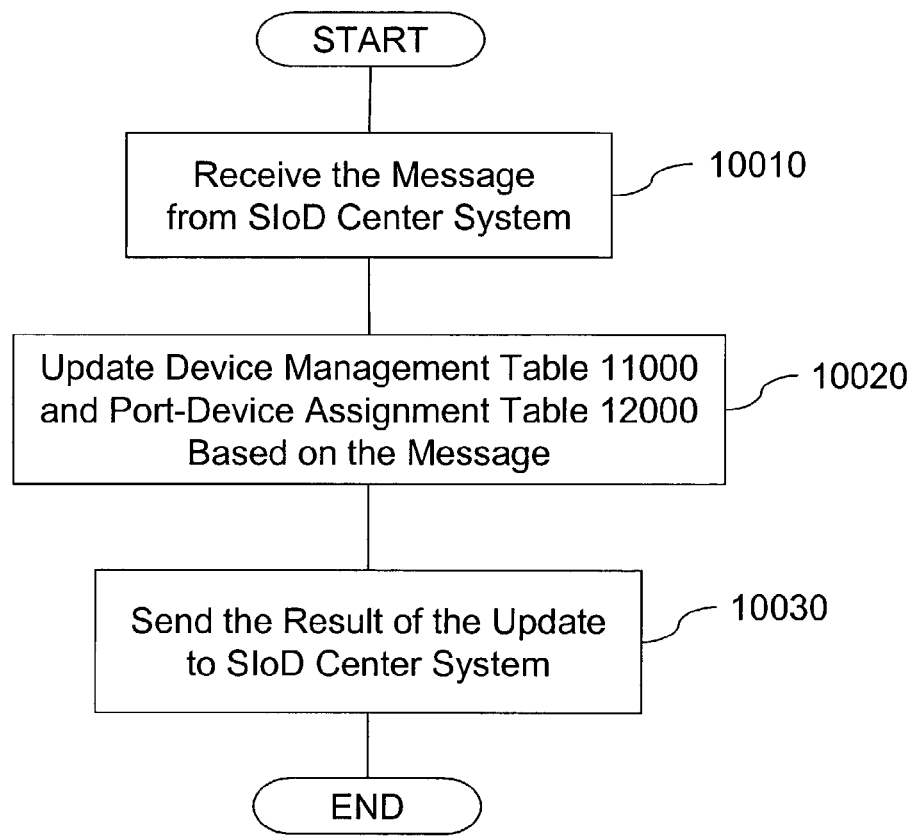
Figure 10: Processing Flow
of Storage Subsystem Resource Management Processor 1222

Figure 11: Device Management Table 11000
(Before SIoD Demand Processing)

| Device No. | Customer ID | Installation Status | SoD Status | Size |
|---|---|---|---|---|
| 1 | 676851011 | Installed | Usable | 500 GB |
| 2 | 676851011 | Installed | Usable | 500 GB |
| 3 | N/A | Installed | Un-Usable | 250 GB |
| 4 | N/A | Installed | Un-Usable | 250 GB |
| 5 | N/A | Not Installed | Un-Usable | N/A |
| ⋮ | | | | |
| n | N/A | Not Installed | Un-Usable | N/A |

Figure 12: Device-Port Assignment Table 12000
(Before SIoD Demand Processing)

| I/O Port ID | Installation Status | Device No. |
|---|---|---|
| 1211 | Installed | 1, 2 |
| 1212 | Installed | None |
| 1213 | Not Installed | N/A |
| ⋮ | | |
| 121m | Not Installed | N/A |

Figure 13: Device Management Table 11000
(After SIoD Demand Processing)

| Device No. | Customer ID | Installation Status | SoD Status | Size |
|---|---|---|---|---|
| 1 | 676851011 | Installed | Usable | 500 GB |
| 2 | 676851011 | Installed | Usable | 500 GB |
| 3 | 676851011 | Installed | Usable | 250 GB |
| 4 | N/A | Installed | Un-Usable | 250 GB |
| 5 | N/A | Not Installed | Un-Usable | N/A |
| ⋮ | | | | |
| n | N/A | Not Installed | Un-Usable | N/A |

Figure 14: Device-Port Assignment Table 12000
(After SIoD Demand Processing)

| I/O Port ID | Installation Status | Device No. |
|---|---|---|
| 1211 | Installed | 1, 2 |
| 1212 | Installed | 1, 2, 3 |
| 1213 | Not Installed | N/A |
| ⋮ | | |
| 121m | Not Installed | N/A |

Figure 15: Processing Flow of Fabric Zone Server 1730
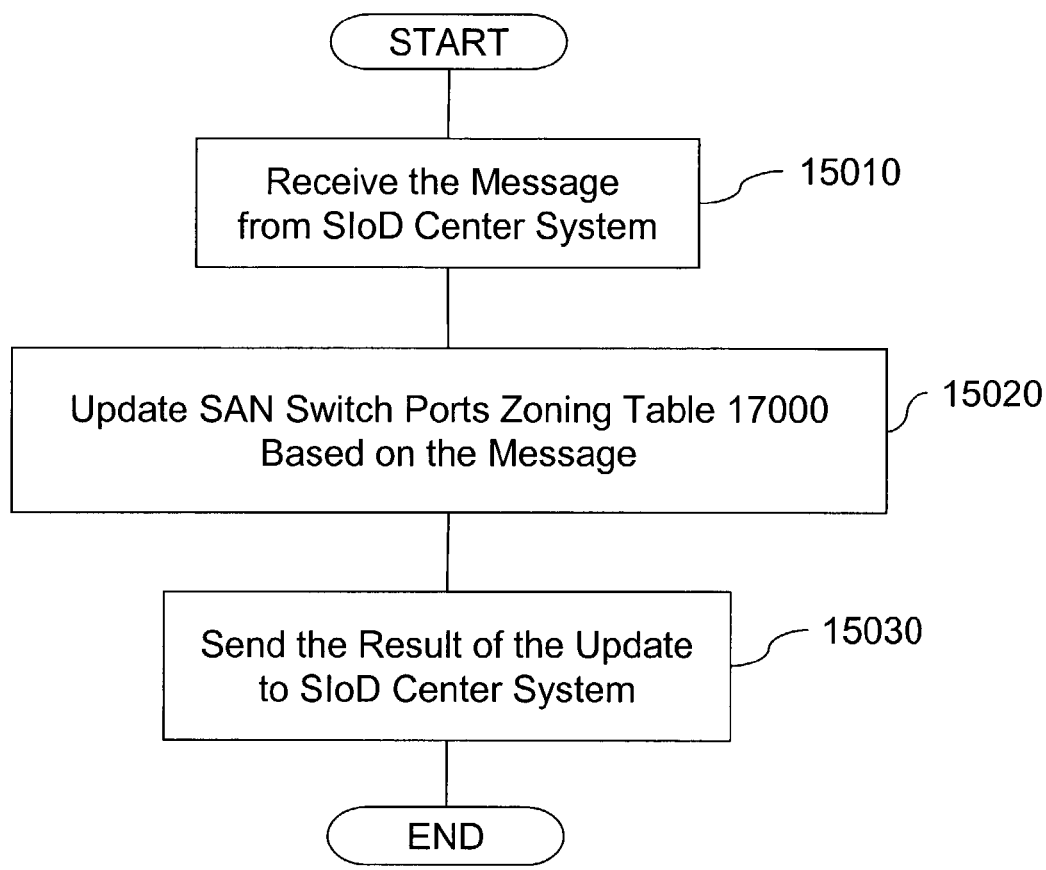

Figure 16: An Example of Changing Zone Setting
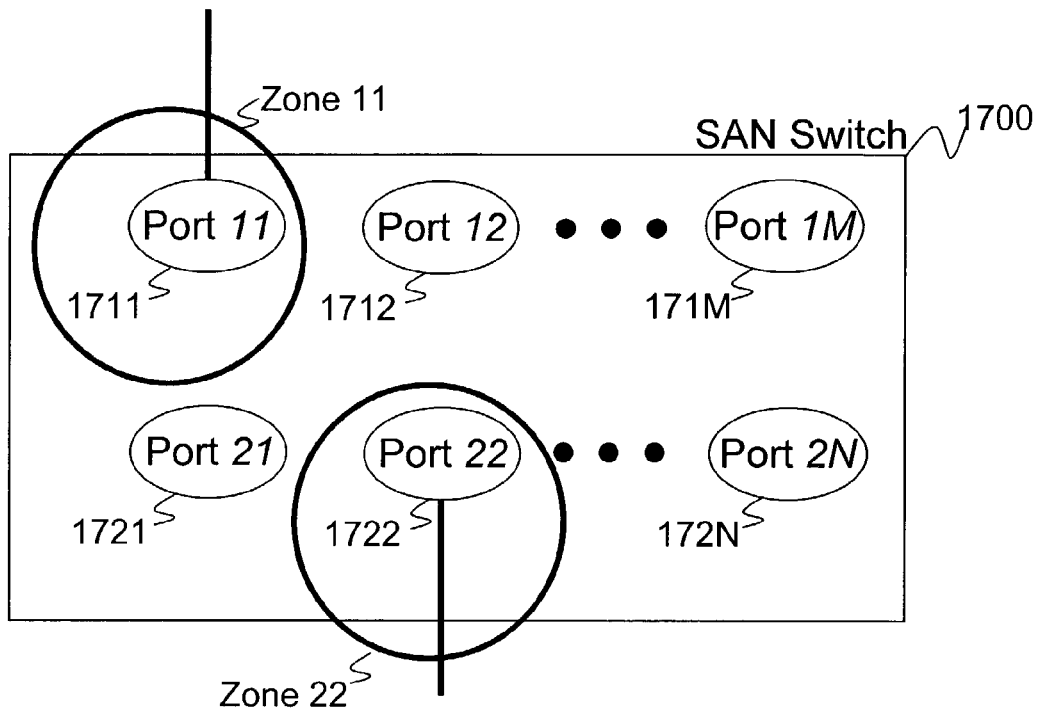
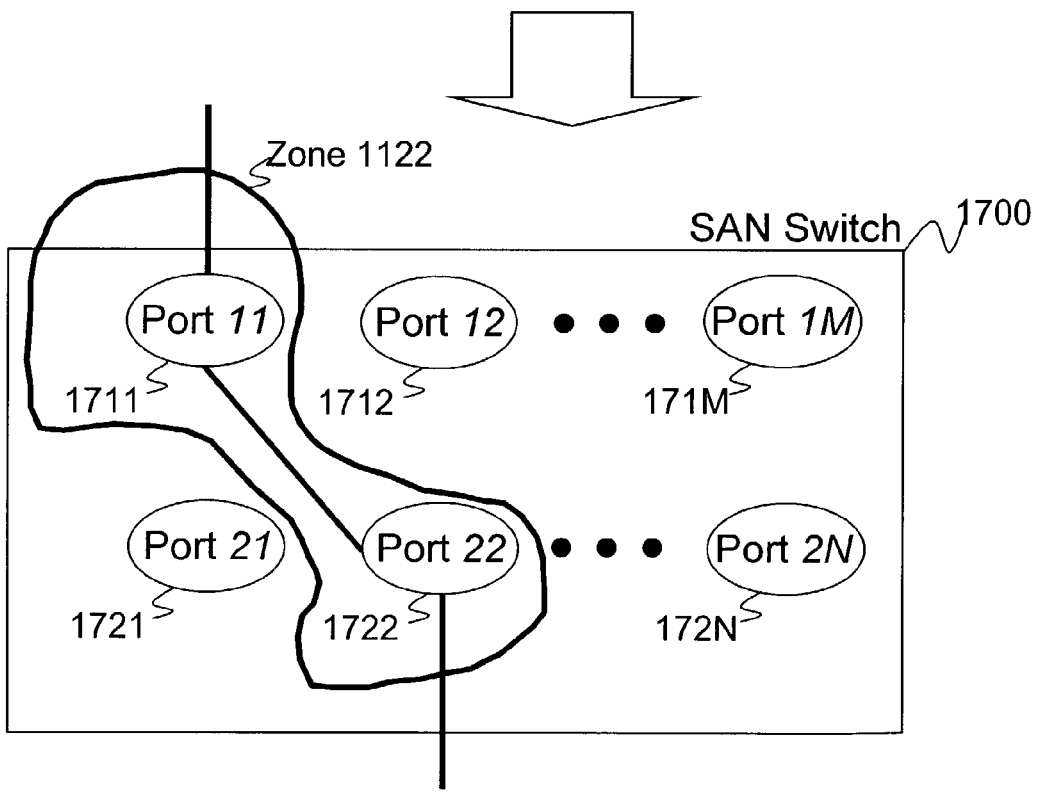

Figure 17: An Example of SAN Switch Ports Zoning Table 17000
(Before SIoD Demand Processing)

| SAN Switch Port ID | Connected Device ID outside SAN Switch | Connected Ports IDs inside SAN Switch |
|---|---|---|
| 1711 | Host I/O Controller: 1431 | None (Isolated) |
| 1712 | Host I/O Controller: 1432 | 1721 |
|  | ••• |  |
| 1721 | I/O Port: 1211 | 1712 |
| 1722 | I/O Port: 1212 | None (Isolated) |
|  | ••• |  |

Figure 18: An Example of SAN Switch Ports Zoning Table 17000
(After SIoD Demand Processing)

| SAN Switch Port ID | Connected Device ID outside SAN Switch | Connected Ports IDs inside SAN Switch |
|---|---|---|
| 1711 | Host I/O Controller: 1431 | 1722 |
| 1712 | Host I/O Controller: 1432 | 1721 |
|  | ••• |  |
| 1721 | I/O Port: 1211 | 1712 |
| 1722 | I/O Port: 1212 | 1711 |
|  | ••• |  |

Figure 19: Detailed Processing Flow of Step 6300
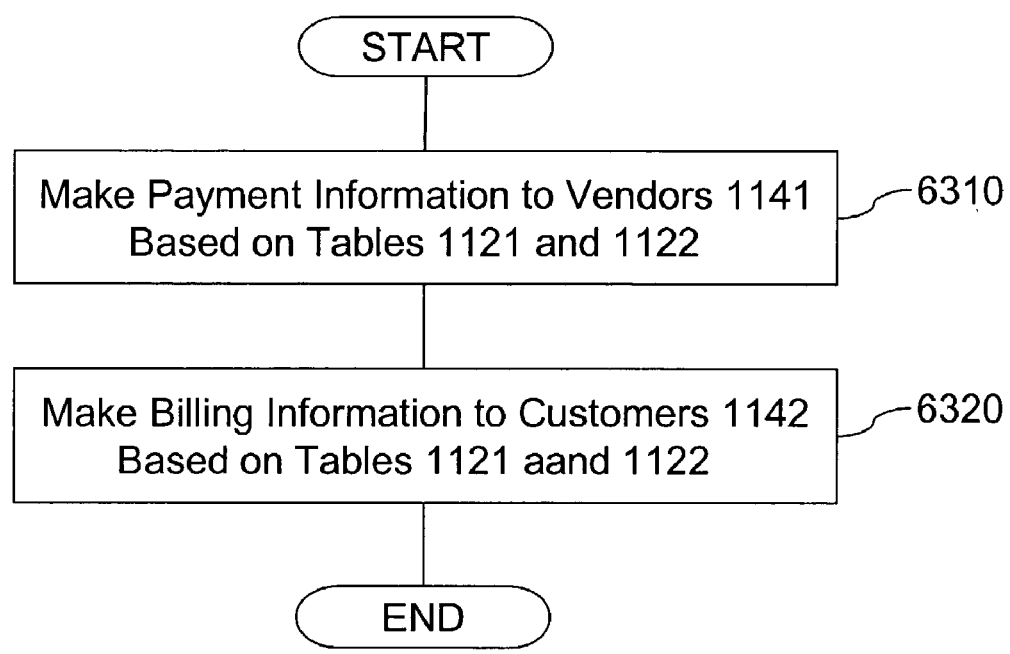

Figure 20: An Example of Billing Information to Customers

| Customer ID | SAN Infrastructure Resources | | Total Price |
|---|---|---|---|
| | No. of SAN Switch Ports | Storage Capacity | |
| 676851011 | 4 | 500 GB | $200K |
| | ... | | |

Figure 21: An Example of Payment Information to SAN Switch Vendors

| SAN Switch Vendor ID | Total No. of Ports | Total Price |
|---|---|---|
| 02764995 | 78 | $840K |
| | ... | |

Figure 22: An Example of Payment Information to Storage Subsystem Vendors

| Storage Subsystem Vendor ID | Total Storage Capacity | Total Price |
|---|---|---|
| 03186390 | 738,000GB | $6,300K |
| | ... | |

SAN INFRASTRUCTURE ON DEMAND SERVICE SYSTEM

BACKGROUND OF THE INVENTION

The present invention relates generally to techniques for managing storage resources, and in particular to techniques for providing storage on demand management services.

The information technology revolution brings with it an ever increasing need for more storage capacity for business enterprises. It is expected that the average Fortune 1000 company's storage requirement will more than double in the coming years. In addition, growth has brought shortages of skilled persons in the information technology field. These challenges confront many companies facing the need to expand and improve their information technology assets. Increasingly, companies are turning to outsourcing storage management as a method of coping with the need to grow capacity in view of rapidly increasing demand. Storage on Demand (SoD) is one such service for providing storage management to business enterprises. By subscribing to an SoD service, companies can obtain needed storage resources by purchasing the services of the SoD service provider. Typical resources available through SoD service providers may include capacity (storage devices), I/O ports, and the like.

While certain advantages to present SoD technologies are perceived, opportunities for further improvement exist. For example, according to conventional SoD technology, an SoD service provider must visit customer's sites to configure the customer's host computer installation to work with the SoD's storage resources. This can be a relatively time-consuming and costly process, especially in a situation where a substantial number of resources are managed. Further, the managing of storage resources is often an on-going task that is conventionally performed by a host computer that uses the storage resources. In other words, using conventional approaches, the SoD provider must visit the customer's site to perform necessary operations on the host computer even after introducing a centralized SoD system.

What is needed are improved techniques for managing storage resources according to user demand.

SUMMARY OF THE INVENTION

The present invention provides improved techniques for managing storage resources, such as disk drives, I/O ports, switching connections, and the like according to user demand for these storage resources. In a representative embodiment, a centralized SIoD system manages installed storage resources in a storage subsystem and connections via a network switch responsive to user demands. Specific embodiments provide users the capability to bring new resources on line, define pathways between resources and provide billing, payment and other accounting information based upon the configurations and connections established responsive to the user demands, for example.

In an SIoD service system where an SIoD center system is linked with at least one storage subsystem or at least two storage devices owned by a vendor, at least one SAN switch equipment owned by another vendor, and at least one host computer owned by a customer via a communications network, the center system inputs an SIoD demand for a host computer of the customer, process the demanded SIoD service by ordering all the related equipment to control the right to use its resources for the host computer, process accounting information based on the SIoD service result to make such business reports as billing and payment documents, and store all the processing results.

In a representative embodiment, the present invention provides a method for controlling a service at a center system, which is connected, via a network, to a host computer, a storage subsystem and a switch. The ports of the switch are physically connected to an I/O controller of the host computer and ports of the storage subsystem. In a representative embodiment, the method comprises receiving a request for establishing a logical data I/O path between the host computer and the storage subsystem via the switch. Directing the switch and the storage subsystem to assign at least one port for the logical data I/O path is also included in the method. Further, the method includes making account information based upon at least the number of ports assigned at the switch. In a specific embodiment, the account information is made from the number of ports assigned at the storage subsystem. In select specific embodiments, the method further comprises sending a message to the storage subsystem to request storage resources and receiving from the storage subsystem a result. The result indicates whether storage resources have been successfully allocated in accordance with the message. The method also includes sending a message to a SAN switch to request an I/O path between a host computer requesting storage and the storage subsystem and receiving from the SAN switch a result. The result indicates whether the I/O path has been successfully established in accordance with the message. The method can also include updating account information based upon results received from the storage subsystem and the SAN switch.

In another representative embodiment, the present invention provides a storage management service system. The system comprises a storage infrastructure on demand (SIoD) center system computer; at least one storage subsystem; and a switch, operative to connect the at least one storage subsystem to one or more host computers. The storage subsystem, the SIoD center system computer, and the switch are interconnected to share information. The SIoD center system computer receives input of a request for establishing a logical data I/O path between the at least one storage subsystem and one or more host computers via the switch. The SIoD center system computer forwards the request to the switch. The switch establishes a connection between at least two ports, including a first port and a second port, the first port being connectable to a host computer, and the second port being connected to the at least one storage subsystem. Further, at least one of the storage subsystem, the SIoD center system computer, and the switch makes account information based on at least upon a number of ports assigned.

In a specific embodiment, the account information comprises at least one of payment information to one or more vendors billing information to one or more customers. The vendors providing at least one of storage subsystem access, network access, and SAN switch access. In select specific embodiments, the host computer and the storage subsystem are connected directly by physical and logical connections made between at least one of a plurality of host I/O controllers and at least one of a plurality of subsystem I/O ports via a SAN switch. In some specific embodiments, the physical and logical connections are made by zoning definitions between ports in the SAN switch connectable to at least one of a plurality of subsystem I/O ports of the storage subsystems and the at least one of a plurality of host I/O controllers of the host computers. In many specific embodiments, the SAN switch comprises at least one of a fibre channel network switch, an IP switch. The one or more host computers of one or more customers are connected to one or more storage subsystems of one or more vendors via the SAN switch of a first vendor that makes at least one connection between at least one host I/O controller of the one or more host computers and at least one subsystem I/O ports of the one or more storage subsystems in select specific embodiments. Further, in some specific embodiments, the SIoD center system of a second vendor tracks port connection information for preparing billing and/or payment information for customers and/or vendors.

In a further representative embodiment, the present invention provides an apparatus. The apparatus can provide management, control, accounting functions, and the like for a storage infrastructure on demand system. Representatively, the apparatus comprises means for receiving a request for storage; means for establishing at least one logical connection between a user of storage and a provider of storage responsive to the request; means for determining a number of resources allocated to establish the logical connection; and means for tracking account information for at least one of the user of storage and the provider of storage. In some specific embodiments of the apparatus, the storage comprises at least one of magnetic disk, an optical disk, a magnetic-optical disk, and a semiconductor memory. In select specific embodiments, the apparatus further comprises means for communicating instructions to the providers of storage; interface to a network; means for communicating instructions to providers of connection services between storage and user; and means for communicating account information to the users and/or the providers. In many specific embodiments, the apparatus further comprises means for communicating instructions to a SAN switch, the SAN switch providing capability to connect host computers to storage subsystems.

In a yet further representative embodiment, the present invention provides a method. The method comprises receiving a request for establishing a logical data I/O path between a requestor of storage and a provider of storage; directing a request for a connection between the requester of storage and the provider of storage to a provider of switching connections; and making account information based upon at least a number of ports assigned in making the connection.

In some specific embodiments, the method also includes directing a request for storage resources between to a provider of storage resources. In some specific embodiments, the method also includes updating SAN switch resource management information; and updating storage subsystem resource management information.

In some specific embodiments of the method, making account information based upon at least a number of ports assigned in making the connection includes preparing billing information to customers and preparing payment information to vendors based upon the SAN switch resource management information.

In some specific embodiments of the method, making account information based upon at least a number of ports assigned in making the connection comprises preparing billing information to customers and preparing payment information to vendors based upon the storage subsystem resource management information.

In a still further representative embodiment, the present invention provides a computer program product for controlling a service at a center system. Using a network, the center system is connected to a host computer, a storage subsystem and a switch whose ports are physically connected to an I/O controller of the host computer and ports of the storage subsystem. The computer program product comprises a variety of code stored on a computer readable storage medium. Code for receiving a request for establishing a logical data I/O path between a requester of storage and a provider of storage may be included in the program product. As can code that directs a request for a connection between the requestor of storage and the provider of storage to a provider of switching connections. Further, the program product can also include code that makes account information based upon at least a number of ports assigned in making the connection, for example.

Numerous benefits are achieved by way of the present invention over conventional techniques. Specific embodiments provide storage infrastructure providers with the capability to automatically generate account information for users and/or vendors based upon connection usage between systems of disparate parties. Users can bring new resources on-line, define pathways between resources, and the like, for example. Embodiments can obviate the need for system programmers from an SIoD service provider to manually configure storage resources on a user's site. Specific embodiments can provide storage resources to users at reduced cost.

These and other benefits are described throughout the present specification. A further understanding of the nature and advantages of the invention herein may be realized by reference to the remaining portions of the specification and the attached drawings.

BRIEF DESCRIPTION OF THE DRAWINGS

FIG. 1 illustrates a diagram of a representative system for embodying an SIoD service in a specific embodiment of the present invention.

FIG. 2 illustrates a representation of an SIoD center system in a specific embodiment of the present invention.

FIG. 3 illustrates a representative host computer system in a specific embodiment of the present invention.

FIG. 4 illustrates a representative SAN Switch/Switched Fabric in a specific embodiment of the present invention.

FIG. 5 illustrates a representative storage subsystem in a specific embodiment of the present invention.

FIG. 6 illustrates a flowchart of representative SIoD center system processing in a specific embodiment of the present invention.

FIGS. 7 and 8 illustrate an example of graphical user interface (GUI) for inputting an SIoD demand to SIoD Center System in a specific embodiment of the present invention.

FIG. 9 illustrates a flowchart of representative SIoD service module processing in an SIoD center system in a specific embodiment of the present invention.

FIG. 10 illustrates a flowchart of representative resource controller processing in a specific embodiment of the present invention.

FIG. 11 illustrates a representative device management table prior to servicing an SIoD request in a specific embodiment of the present invention.

FIG. 12 illustrates a representative device port assignment table prior to servicing an SIoD request in a specific embodiment of the present invention.

FIG. 13 illustrates a representative device management table after SIoD service processing in a specific embodiment of the present invention.

FIG. 14 illustrates a representative device port assignment table after SIoD service processing in a specific embodiment of the present invention.

FIG. 15 illustrates a flowchart of representative processing within a fabric zone server of SAN switch in a specific embodiment of the present invention.

FIG. 16 illustrates a representative example of zoning in a specific embodiment of the present invention.

FIG. 17 and FIG. 18 illustrate a representative SAN switch zoning table, before and after applying SIoD service, respectively in a specific embodiment of the present invention.

FIG. 19 illustrates a flowchart of representative accounting processing in a specific embodiment of the present invention.

FIG. 20 illustrates representative billing information to customers in a specific embodiment of the present invention.

FIG. 21 illustrates representative payment information to SAN system vendors in a specific embodiment of the present invention.

FIG. 22 illustrates representative payment information to storage system vendors in a specific embodiment of the present invention.

DESCRIPTION OF THE SPECIFIC EMBODIMENTS

The present invention provides improved techniques for managing storage resources, such as disk drives, I/O ports, and the like according to user demand for these storage resources. In a specific embodiment, a centralized SIoD system manages installed storage resources in a storage subsystem and connections via a network switch responsive to user demands. Specific embodiments provide users the capability to bring new resources on line, define pathways between resources and provide billing, payment and other accounting information based upon the configurations and connections established responsive to the user demands, for example.

System Configuration

FIG. 1 illustrates a diagram of a representative system for providing centralized SIoD service in a specific embodiment of the present invention. In FIG. 1, the SIoD service system is comprised of an SIoD center system 1100 coupled via a communications network 1500 to a storage subsystem 1200, SAN Switch or Switched Fabric 1700 and host computer 1400. In specific embodiments, SAN Switch 1700 is, in part, physically connected with Host Computer 1400 and Storage Subsystem 1200 in advance (before SIoD).

The SIoD center system 1100 comprises a computer connected to an input device, an output device, a storage device, and a communications link that connects SIoD center system 1100 to the network 1500. In a representative embodiment, the input device is at least one of a keyboard, a mouse, a touch screen, or a track ball. The output device is a display. The storage device may be a magnetic disk, an optical disk, a magnetic-optical disk, or a semiconductor memory. The storage device has a storage capacity sufficient to store files for execution of programs, as well as data. In a presently preferred embodiment, the communications link is capable of high-speed communications.

FIG. 2 illustrates a representation of an SIoD center system in a specific embodiment of the present invention. The SIoD Center System 1100 includes a storage device of sufficient storage capacity to store therein files for execution of programs and for a large amount of data. The files include Storage Subsystem Resource Management Tables 1121 and SAN Switch Resource Management Tables 1122, both of which may be just a set of copies of Tables 11000 and 12000 shown in FIG. 5 and Table 1740 shown in FIG. 4, respectively, and Payment Information to Vendors 1141 and Billing Information to Customers 1142. The programs include SIoD Resource Manager 1110 and Accounting Manager 1130. While one specific embodiment for realizing the SIoD center system1100 has been described, other embodiments having other and different hardware and software may be used to embody the SIoD center system 1100 of the present invention.

FIG. 3 illustrates a representative host computer system in a specific embodiment of the present invention. A user may interact with the storage subsystem 1200 via any computer system as its host computer, such as host computer 1400, if the host computer has at least one port to communicate with the SIoD center system 1100 and at least one host I/O controllers (1431 through 143L) each of which can be physically connected with cables to a SAN Switch Port, such as ports 1711 to 171M of SAN switch 1700 in FIG. 4. No other special hardware is needed to run the customer's application programs.

In a specific embodiment, the host computer 1400 comprises an operating system and an I/O path setting table (not shown in FIG. 3). The operating system is operatively disposed to coordinate information flowing to and from host I/O controllers 1431 through 143L. Also, the operating system controls processing of system events within host computer 1400. Host computer 1400 further comprises an SIoD agent (not shown) that runs under the operating system, which controls the host I/O controllers (1431 through 143L) and the I/O path setting table. The SIoD agent acts as a bridge between the SIoD center system 1100 and the operating system of the host computer 1400 by translating commands from the SIoD center system 1100 into requests to the operating system to update I/O path setting table to reflect resource allocations made by the resource controller 1220 in the storage subsystem 1200 on behalf of the users of the host computer 1400.

FIG. 4 illustrates a representative SAN Switch/Switched Fabric in a specific embodiment of the present invention. The SAN Switch/Switched Fabric 1700 includes at least two Ports (1711 through 171M and 1721 through 172N), a fabric zone server 1730 and a SAN switch ports zoning table 1740. The zoning table 1740 includes such columns as SAN Switch Port ID (17010), Connected Device ID outside SAN Switch (17020), and Connected Ports Ids inside SAN Switch (17030). SAN Switch can be FC-based and/or IP-based.

FIG. 5 illustrates a representative storage subsystem in a specific embodiment of the present invention. The storage subsystem 1200 comprises at least two I/O ports (1211 through 121m), one or more storage devices (1231 through 123n), and a storage subsystem resource controller 1220, which manages storage resources in the storage subsystem 1200. The plurality of I/O ports 1211 through 121m provides connectivity to one or more host computers such as host computer 1400 via the SAN switch 1700. The resource controller 1220 comprises of a storage subsystem resource management processor 1222 and a memory 1221. The I/O ports 1211 through 121m are connected to the resource controller 1220. Storage devices 1231 through 123n are also connected to the resource controller 1220. Memory 1221 of the resource controller 1220 stores a device management table 11000 and a port-device assignment table 12000, which are also shown in FIG. 11 and FIG. 12, respectively.

Storage Infrastructure Demand Processing

FIG. 6 through FIG. 22 are diagrams illustrating SIoD service system processing in representative specific embodiments of the present invention.

FIG. 6 illustrates a flowchart of representative SIoD center system processing in a specific embodiment of the present invention. In FIG. 6, the SIoD center system 1100 inputs an SIoD demand for a Host Computer of a customer in a step 6100. In a step 6200, the SIoD center system 1100 performs SIoD service processing. Then, in a step 6300, the SIoD center system 1100 performs accounting information processing. The SIoD center system 1100 then stores an SIoD service processing result in a step 6400.

FIG. 7 and FIG. 8 illustrate an example of graphical user interface (GUI) for inputting an SIoD demand to SIoD Center System 1100. In specific embodiments, the GUI enables users to click a shaded icon of any resource to make it usable, and to draw a solid connecting line between any pair of resource icons to make a new logical data I/O path.

FIG. 7 illustrates an example of a graphical user interface (GUI) for receiving input of an SIoD demand to the SIoD center system 1100 in a specific embodiment of the present invention. FIG. 7 illustrates a first representative user interface screen 1000, having a host computer panel 1002, which comprises icons for each host I/O controller known to the system, such as host I/O controller number 1 (1431) and host I/O controller 2 (1432). A legend panel 1004 provides information useful to the user, such as indications used in the other panels and their associated meanings. A storage subsystem panel 1006 provides information about the storage subsystem 1200. Storage subsystem panel 1006 comprises a plurality of icons, including icons corresponding to the I/O port number 1 (1211), I/O port number 2 (1212), and the like, as well as icons corresponding to storage devices, such as device number 1 (1231), device number 2 (1232), and so forth. A SAN Switch panel 1008 provides information about SAN Switch Ports. FIG. 7 illustrates GUI 1000 depicting a hypothetical "Before SIoD" situation wherein the customer already has a logical data I/O path going from Host I/O Controller 2 (1432) to Devices 1 (1231) and 2 (1232) through SAN Switch Ports 12 (1712) and 21 (1721) and I/O Port 1 (1211). By contrast, FIG. 8 illustrates GUI 1010 depicting a hypothetical "After SIoD" situation wherein a logical data I/O path going from Host I/O Controller 1 (1431) up to device 1 (1231) device 2 (1232) and device 3 (1233) through SAN switch ports 11 (1711) and 22 (1722) and I/O Port 2 (1212) has newly been added.

FIG. 8 illustrates a second representative user interface screen 1010, corresponding to a situation, herein referred to as "After SIoD", where another channel, I/O port number 2 (1212), is demanded through host I/O controller 2 (1432). This may occur as a result of a user who desires greater bandwidth between the host computer 1400 and the devices of the storage subsystem 1200, for example. The user configures the system using the user interface screen 1010 by first making device number 3 usable. The user clicks a shaded icon corresponding to a resource to make it usable. Once the user has clicked the icon corresponding to the device number 3, the icon is depicted in a color or other indication that shows that the corresponding device is now usable. Next, the user establishes a connection between resources by drawing a connecting line between two or more resources to create a new I/O path. In the user interface screen 1010, the user has established a second I/O path 1012 defined from host I/O controller 1 (1432) to device number 1 (1231) and device number 2 (1232) and device number 3 via I/O port number 2 (1212) of the storage subsystem 1200 and SAN switch port 11 (1711) and SAN switch port 22 (1722). Based upon the inputs of the user, the resource controller 1220 updates the port device management table 11000 and the device port assignment table 12000, as shown by FIG. 11 and FIG. 12, respectively.

FIG. 9 illustrates a flowchart of representative SIoD service module processing in an SIoD center system in a specific embodiment of the present invention. In FIG. 9, the SIoD center system 1100 sends the demand message to the resource controller 1220 of storage subsystem 1200 in a step 6210, and receives a result for the order processing from the resource controller 1220 in a step 6220. The SIoD center system 1100 sends the demand message to the fabric zone server 1730 of SAN switch 1700 in a step 6230. Then, the SIoD center system 1100 receives a result for the order processing from the fabric zone server 1730 in a step 6240. In a step 6250, the SIoD center system 1100 updates tables 1121 and 1122 based upon the results received in steps 6220 and 6240, which completes the processing of FIG. 9.

FIG. 10 illustrates a flowchart of representative resource controller processing in a specific embodiment of the present invention. In FIG. 10, the resource controller 1220 receives the SIoD demand from the SIoD center system 1100 in a step 10010. In a step 10020, the resource controller 1220 updates the device management table 11000 and the port device assignment table 12000. Then, in a step 10030, the results of the updates are sent to the SIoD center system 1100.

FIG. 11 and FIG. 12 show device management table 11000 and device-port assignment table 12000, respectively, before applying SIoD service in a specific embodiment of the present invention. FIG. 13 and FIG. 14 illustrate after applying SIoD service in a specific embodiment of the present invention. As illustrated by comparison of these figures, before applying the SIoD service request, a customer (ID: 676851011) has access to 1 TB of storage capacity through one logical data I/O path. However, after applying the SIoD service request, that customer will be able to access 1.25 TB through a second path, while keeping the previously defined data path.

FIG. 11 illustrates a representative device management table prior to servicing an SIoD request in a specific embodiment of the present invention. The device management table 11000 includes such columns as a Device No. (11010), a Customer ID (11020), an Installation Status (11030), an SIoD Status (11040), and a Size (11050). FIG. 13 illustrates a representative device management table after servicing an SIoD request in a specific embodiment of the present invention. A comparison between FIGS. 11 and 13 reveals that the SIoD service processing caused device number 3 to be marked as usable in the SoD Status field 11040, and the identifier of a customer, customer 676851011, has been included in the customer ID field 11020 for this device.

FIG. 12 illustrates a representative device port assignment table prior to servicing an SIoD request in a specific embodiment of the present invention. The Device-Port Assignment Table 12000 includes such columns as an I/O Port ID (12010), an Installation Status (12020), and a Device No. (12030). FIG. 14 illustrates a representative device port assignment table after servicing an SIoD request in a specific embodiment of the present invention. A comparison between FIGS. 12 and 14 reveals that the SIoD service processing caused device number 3 to be added in the device number field 12030 for the port ID 1212.

FIG. 15 illustrates a flowchart of representative processing within a fabric zone server of SAN switch in a specific embodiment of the present invention. Fabric zone server 1730 receives the SIoD demand message from the SIoD Center System 1100 in step 15010. Then, the fabric zone server 1730 updates SAN switch zoning table 17000 based on the message in step 15020 and sends the update result to SIoD Center System 1100 in step 15030. In a specific embodiment, "zoning" functionality, which is popularly implemented in FC switches, may be used to control the usability of switch ports. This functionality may be incorporated into the fabric zone server 1730. In accordance with zoning functionality, ports must be within a common zone in order to be connected with one another.

FIG. 16 illustrates a representative example of zoning in a specific embodiment of the present invention. By making a zone comprised of one port, such as defining zone 11 to include exclusively port 11 (1711), port 11 cannot be connected to any other ports, such as port 22 (1722) of zone 22, for example. However, by altering the zoning to create a zone 1122, which includes both port 11 and port 22, the two previously isolated ports can be connected to each other.

FIG. 17 and FIG. 18 illustrate a representative SAN switch zoning table, before and after applying SIoD service, respectively in a specific embodiment of the present invention. The SAN switch zoning table 17000 includes such columns as a SAN Switch Port ID (17010), a Connected Device ID outside SAN Switch (17020), and a Connected Ports Ids inside SAN Switch (17030). A comparison between FIGS. 17 and 18 reveals that the SIoD service processing caused the switch port ID 1722 to be inserted in the Connected Ports Ids inside SAN Switch (17030) field for SAN Switch Port ID 1711, and the switch port ID 1711 to be inserted in the Connected Ports Ids inside SAN Switch (17030) field for SAN Switch Port ID 1722. This cross-referencing establishes a common zone facilitating a connection between these two ports.

FIG. 19 illustrates a flowchart of representative accounting processing in a specific embodiment of the present invention. Step 6300 of FIG. 19 comprises a variety of accounting information processing that is illustrated in FIG. 19. In a step 6310, the SIoD Center System 1100 makes payment information for vendors 1141 and billing information to customers 1142. This information can be determined based upon tables 1121 and 1122, for example.

FIGS. 20 through FIG. 22 illustrate examples of billing information to customers 20000, payment information to SAN switch vendors 21000 and payment information to storage subsystem vendors 22000, respectively, in a specific embodiment of the present invention. FIG. 20 illustrates representative billing information in a specific embodiment of the present invention. Billing information to customers 20000 includes such columns as Customer ID (20010), No. of SAN Switch Ports (20021), Storage Capacity (20022) and Total Price (20030), in a representative example embodiment. FIG. 21 illustrates representative payment information to SAN switch vendors in a specific embodiment of the present invention. Payment Information to SAN Switch Vendors 21000 includes such columns as SAN Switch Vendor ID (21010), Total No. of Ports (21020), and Total Price (21030). FIG. 22 illustrates representative payment information to storage system vendors in a specific embodiment of the present invention. Payment Information to Storage Subsystem Vendors 22000 includes such columns as Storage Subsystem Vendor ID (22010), Total Storage Capacity (22020), and Total Price (22030).

The preceding has been a description of the preferred embodiment of the invention. It will be appreciated that deviations and modifications can be made without departing from the scope of the invention, which is defined by the appended claims.

What is claimed is:

1. A method for controlling a service at a center system, wherein via a network, the center system is connected to a host computer, a storage subsystem and a switch whose ports are physically connected to an I/O controller of the host computer and ports of the storage subsystem, the method comprising:

receiving a storage allocation demand comprising a request for establishing a logical data I/O path between the host computer and the storage subsystem via the switch;

directing the switch and the storage subsystem to assign at least one port for the logical data I/O path;

making account information based upon at least the number of ports assigned at the switch; wherein:

the account information comprises at least a billing information and a payment information;

the storage allocation demand is received by the center system from the host computer, the center system, in response to the received demand, allocating storage volumes within the storage subsystem to the host computer;

a type of the account information is based on a type of a user of the allocated storage volumes and based on stored management information and a total number of the assigned switch ports or a total capacity of the allocated storage volumes are selected based on the type of the user for making the account information;

wherein if the user is a customer, the total number of allocated switch ports and the total capacity of allocated storage volumes are used; if the user is a SAN switch vendor, the total number of allocated switch ports is used; and if the user is a storage vendor, the total capacity of allocated storage volumes is used.

2. The method of claim 1, wherein
the account information is made from the number of ports assigned at the storage subsystem.

3. The method of claim 1, further comprising:
sending a message to the storage subsystem to request storage resources;

receiving from the storage subsystem a result, the result indicating whether storage resources have been successfully allocated in accordance with the message;

sending a message to a SAN switch to request an I/O path between a host computer requesting storage and the storage subsystem;

receiving from the SAN switch a result, the result indicating whether the I/O path has been successfully established in accordance with the message; and updating account information based upon results received from the storage subsystem and the SAN switch.

4. A storage management service system, comprising:
at least one storage subsystem;

a storage infrastructure on demand (SIoD) cemer system computer operable to receive a storage allocation demand from one or more host computers and, in response to the received demand, to allocate storage resources within the at least one storage subsystem to the one or more host computers;

a switch, operative to connect the at least one storage subsystem to the one or more host computers; wherein:

the storage subsystem, the SIoD center system computer, and the switch are interconnected to share information;

the SIoD center system computer receives input of a request for establishing a logical data I/O path between the at least one storage subsystem and one or more host computers via the switch;

the SIoD center system computer forwards the request to the switch; the switch establishes a connection between at least two ports, including a first port and a second port, the first port being connectable to a host computer, and the second port being connected to the at least one storage subsystem; and at least one of the storage subsystem, the SIoD center system computer, and the switch makes account information based on at least upon a number of ports assigned, wherein:

the account information comprises at least a billing information and a payment information;

a type of the account information is based on a type of a user of allocated storage resources and based on stored management information and a total number of the assigned switch ports or a total capacity of the allocated storage resources are selected based on the type of the user for making the account information;

wherein if the user is a customer, the total number of allocated switch ports and the total capacity of allocated storage resources are used; if the user is a SAN switch vendor, the total number of allocated switch ports is used; and if the user is a storage vendor, the total capacity of allocated storage resources are used.

5. The system of claim 4, wherein the account information comprises at least one of:

payment information to one or more vendors, the vendors providing at least one of:

storage subsystem access, network access, and SAN switch access; and billing information to one or more customers.

6. The system of claim 4, wherein the host computer and the storage subsystem are connected directly by physical and logical connections made between at least one of a plurality of host I/O controllers and at least one of a plurality of subsystem I/O ports via a SAN switch.

7. The system of claim 6, wherein the physical and logical connections are made by zoning definitions between ports in the SAN switch connectable to the at least one of a plurality of subsystem I/O ports of the storage subsystems and the at least one of a plurality of host I/O controllers of the host computers.

8. The system of claim 6, wherein the SAN switch comprises at least one of a fibre channel network switch, an IP switch.

9. The system of claim 6, wherein one or more host computers of one or more customers are connected to one or more storage subsystems of one or more vendors via the SAN switch of a first vendor that makes at least one connection between at least one host I/O controller of the one or more host computers and at least one subsystem I/O ports of the one or more storage subsystems.

10. The system of claim 9, wherein the SIoD center system of a second vendor tracks port connection information for preparing billing and/or payment information for customers and/or vendors.

11. An apparatus comprising:

storage infrastructure on demand (SIoD) center system means for receiving a request for storage and for allocating the storage in response to the received request;

means for establishing at least one logical connection between a user of storage and a provider of storage responsive to the request;

means for determining a number of resources allocated to establish the logical connection; and means for tracking account information for at least one of the user of storage and the provider of storage, wherein the account information comprises at least a billing information and a payment information, wherein:

a type of the account information is based on a type of a user of the allocated resources and based on stored management information and a total number of the assigned switch ports or a total capacity of the allocated storage volumes are selected based on the type of the user for making the account information;

wherein if the user is a customer, the total number of allocated switch ports and the total capacity of allocated storage volumes are used; if the user is a SAN switch vendor, the total number of allocated switch ports is used; and if the user is a storage vendor, the total capacity of allocated storage volumes is used.

12. The apparatus of claim 11, wherein the storage comprises at least one of magnetic disk, an optical disk, a magnetic-optical disk, and a semiconductor memory.

13. The apparatus of claim 11, further comprising:

means for communicating instructions to the providers of storage;

interface to a network;

means for communicating instructions to providers of connection services between storage and user; and means for communicating account information to the users and/or the providers.

14. The apparatus of claim 11, further comprising:

means for communicating instructions to a SAN switch, the SAN switch providing capability to connect host computers to storage subsystems.

15. A method for controlling allocation of storage at a center system, the method comprising:

receiving a request for establishing a logical data I/O path between a user of storage and a provider of storage;

directing a request for a connection between the user of storage and the provider of storage to a provider of switching connections; and making account information based upon at least a number of ports assigned in making the connection; wherein:

the account information comprises at least a billing information;

a type of the account information is based on a type of a user of storage and based on stored management information and a total amount of allocated storage or a total number of allocated switching connections are selected based on the type of the user for making the account information;

wherein if the user is a customer, the total number of allocated switching connections and the total capacity of allocated storage are used; if the user is a SAN switch vendor, the total number of allocated switching connection is used; and if the user is a storage vendor, the total capacity of allocated storage is used.

16. The method of claim 15, further comprising:
directing a request for storage resources between to a provider of storage resources.

17. The method of claim 16, further comprising:
updating SAN switch resource management information; and
updating storage subsystem resource management information.

18. The method of claim 17, wherein:
making account information based upon at least a number of ports assigned in making the connection comprises:
preparing billing information to customers and preparing payment information to vendors based upon the SAN switch resource management information.

19. The method of claim 17, wherein:
making account information based upon at least a number of ports assigned in making the connection comprises:
preparing billing information to customers and
preparing payment information to vendors based upon the storage subsystem resource management information.

20. A computer program product for controlling a service at a center system, wherein via a network, the center system is connected to a host computer, a storage subsystem mad a switch whose ports are physically connected to an I/O controller of the host computer and ports of the storage subsystem, the computer program product comprising:

code for receiving a request for establishing a logical data I/O path between a requestor of storage and a provider of storage;

code that directs a request for a connection between the requester of storage and the provider of storage to a provider of switching connections;

code that makes account information based upon at least a number of ports assigned in making the connection; and a computer readable storage medium for holding the codes; wherein the account information comprises at least a billing information and a payment information, wherein:

a type of the account information is based on a type of a user of storage and based on stored management information and a total capacity of allocated storage or a total number of allocated ports is selected based on the type of the user for making the account information;

wherein if the user is a customer, the total number of allocated ports and the total capacity of allocated storage are used; if the user is a SAN switch vendor, the total number of allocated ports is used; and if the user is a storage vendor, the total capacity of allocated storage is used.

\* \* \* \* \*